United States Patent
Jang (10) Patent No.: US 6,693,482 B2
(45) Date of Patent: Feb. 17, 2004

(54) VOLTAGE GENERATION CIRCUITS AND METHODS OF OPERATING SAME THAT USE CHARGE SHARING TO INCREASE VOLTAGE STEP-UP

(75) Inventor: Seong-Jin Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/210,605

(22) Filed: Aug. 1, 2002

(65) Prior Publication Data

US 2003/0025548 A1 Feb. 6, 2003

(30) Foreign Application Priority Data

Aug. 1, 2001 (KR) ......................... 2001-46567

(51) Int. Cl.[7] .............................. G05F 1/10; H02M 3/18
(52) U.S. Cl. ......................................... 327/535; 363/59
(58) Field of Search ................................ 323/268, 269, 323/271, 273, 311, 313, 314, 317; 327/530, 534–541; 363/59, 60

(56) References Cited

U.S. PATENT DOCUMENTS

| | | | | |
|---|---|---|---|---|
| 5,914,631 A | * | 6/1999 | Soneda | 327/535 |
| 6,147,566 A | * | 11/2000 | Pizzuto et al. | 331/111 |
| 6,271,714 B1 | * | 8/2001 | Shin | 327/535 |
| 6,483,376 B1 | * | 11/2002 | Bienvenu et al. | 327/536 |

* cited by examiner

*Primary Examiner*—Matthew V. Nguyen
(74) *Attorney, Agent, or Firm*—Myers Bigel Sibley & Sajovec, P.A.

(57) ABSTRACT

A voltage generation circuit generates an output voltage at an output node thereof by sharing charge between a first node and a second node so as to increase a potential at the second node from a first voltage to a second voltage. The first node is charged to a third voltage and the second node is driven to a fourth voltage that is greater than the third voltage. Charge is shared between the first node and the second node so that the first and second nodes reach a common fifth voltage, which is between the third and fourth voltages. The first node is driven to a sixth voltage, which is greater than the fourth voltage. Charge is shared between the first node and the output node to generate the output voltage thereat.

35 Claims, 5 Drawing Sheets

VOLTAGE GENERATION CIRCUITS AND METHODS OF OPERATING SAME THAT USE CHARGE SHARING TO INCREASE VOLTAGE STEP-UP

RELATED APPLICATION

This application claims the benefit of Korean Patent Application No. 2001-46567, filed Aug. 1, 2001, the disclosure of which is hereby incorporated herein by reference.

FIELD OF THE INVENTION

The present invention relates generally to integrated circuit devices and methods of operating same and, more particularly, to integrated circuit memory devices and methods of operating same.

BACKGROUND OF THE INVENTION

A conventional integrated circuit memory device may include a high voltage generating circuit for generating a voltage higher than a power voltage. Devices using a battery as a power source may include a high voltage generating circuit for generating a voltage higher than a battery power voltage. A high voltage generating circuit of an integrated circuit memory device may generate a high voltage target of about 4 volts when an external power voltage is in a predetermined range, such as, for example, about 2.2 volts to about 2.8 volts.

As a level of a power voltage of a system incorporating an integrated circuit memory device is decreased, however, a level of an external power voltage applied to the integrated circuit memory device may also decrease. Accordingly, when an external power voltage less than, for example, about 2.2 volts is applied, the integrated circuit memory device's high voltage generating circuit may not be able to generate a target voltage of about 4 volts.

In more detail, the integrated circuit memory device's high voltage generating circuit may use a step-up capacitor having a specific side based on the assumption that an external power voltage is in a predetermined range. When an external power voltage falls below the expected voltage range, the high voltage generating circuit may generate a target voltage of about 4 volts by increasing the capacitance of the step-up capacitor. Unfortunately, increasing the size of the step-up capacitor may increase the layout area needed to accommodate the high voltage generating circuit.

Figure 1:
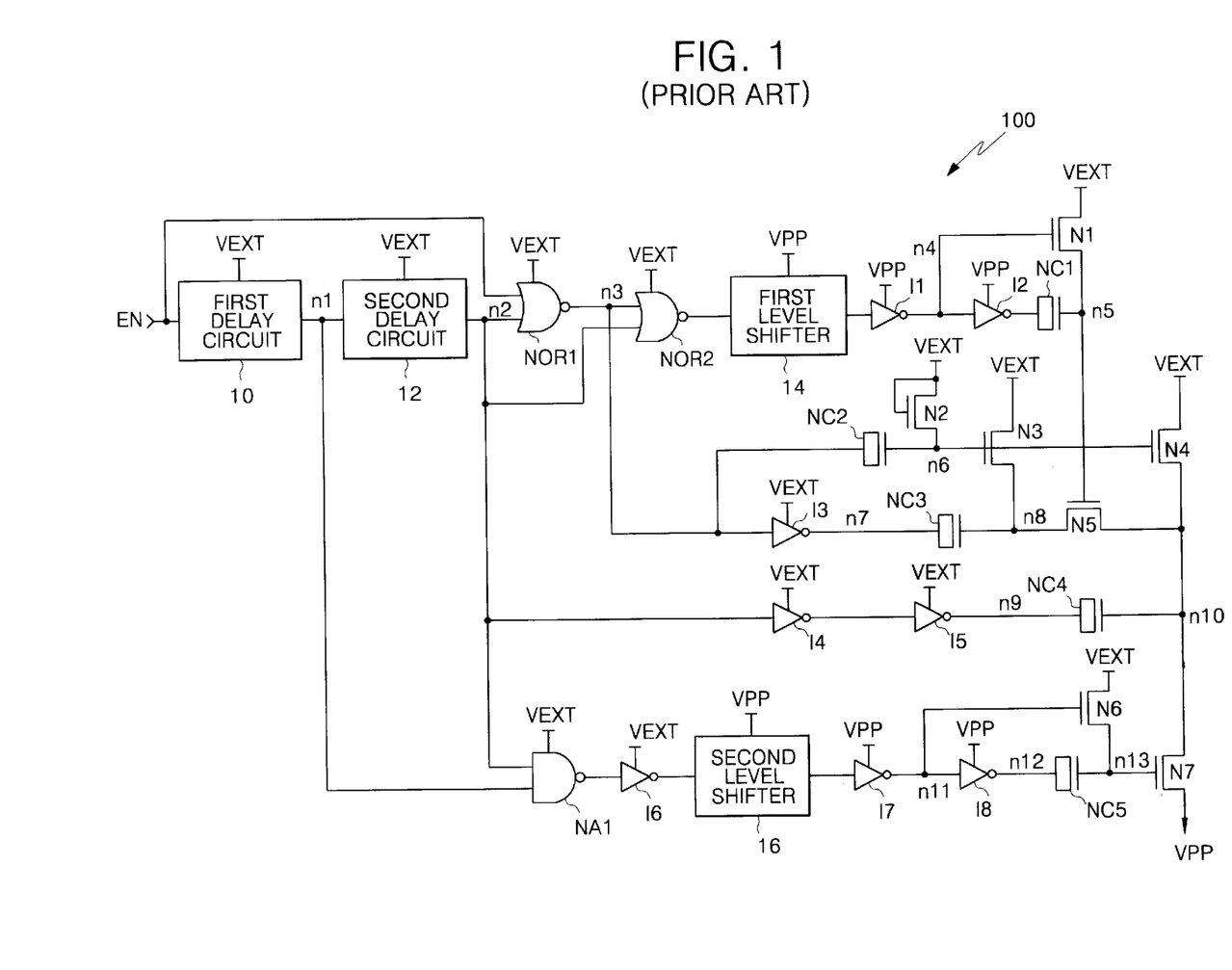
FIG. 1 is a block diagram that illustrates a conventional voltage generation circuit.

A conventional high voltage generating circuit 100 will now be described with reference to FIG. 1. Signals and the media carrying those signals may be referred to by the same names. Referring now to FIG. 1, the conventional high voltage generating circuit 100 comprises first and second delay circuits 10 and 12, first and second level shifters 14 and 16, NOR gates NOR1 and NOR2, a NAND gate NA1, inverters I1 through I8, NMOS transistors NC1 through NC5, and NMOS transistors N1 through N7.

An external power voltage VEXT is applied to the first and the second delay circuits 10 and 12, the NOR gates NOR1 and NOR2, the NAND gate NA1, and the inverters I3 through I6. A high voltage VPP is applied to the inverters I1, I2, I7, and I8, and the first and second level shifters 14 and 16.

The first and the second delay circuits 10 and 12, the NOR gates NOR1 and NOR2, the first and the second level shifters 14 and 16, the NAND gate NA1, the inverters I1 through I8, the NMOS capacitors NC1 and NC2, and the NMOS transistors N1 and N2 comprise a circuit that generates control signals for controlling a voltage step-up operation of the high voltage generating circuit. The NMOS transistors N3, N4, and N6 comprise a circuit that pre-charges signals n8, n10, and n13 during a pre-charge operation. The NMOS capacitor NC3 and the NMOS transistor N5 comprise a first step-up circuit that steps-up the signal n10, which corresponds to a step-up node, during an active operation. The NMOS capacitor NC4 comprises a second step-up circuit that steps-up the signal n10 node during an active operation. The NMOS capacitor NC5 comprises a step-up circuit that steps-up the signal n13 during an active operation. The NMOS transistor N7 comprises a high voltage transmission circuit that transmits the signal n10 at the step-up node to a high voltage generation terminal during an active operation.

The first delay circuit 10 delays a pulse signal EN by a first delay time d1 to generate a signal n1. The second delay circuit 12 delays an output signal of the first delay circuit 10 by a second delay time d2 to generate a signal n2. The NOR gate NOR1 NORs the pulse signal EN and the signal n1 to generate a signal n3. The NOR gate NOR2 NORs the signals n2 and n3. The NAND gate NA1 and the inverter I6 AND the signals n2 and n3. The first and the second level shifters 14 and 16 level-shift levels of the output signals of the NOR gate NOR2 and the inverter I6, respectively. The inverter I1 inverts an output signal of the first level shifter 14 to generate a signal n4. The inverter I2 inverts an output signal of the inverter I1. The NMOS capacitor NC1 pre-charges a signal n5 to a level of the external power voltage VEXT in response to an output signal of the inverter I2. The NMOS transistor N1 generates a signal n5 at the external power voltage level VEXT in response to the signal n4. The inverter I3 inverts the signal n3 to generate a signal n7. The NMOS transistor N2 generates a signal n6 at the external power voltage level VEXT. The NMOS capacitor NC2 pre-charges the signal n6 to the external power voltage VEXT level in response to the signal n3. The NMOS transistor N3 generates a signal n8 at the external power voltage level VEXT in response to the signal n3. The NMOS capacitor NC3 steps up the signal n8 in response to the signal n7. The NMOS transistor N5 facilitates charge sharing between nodes n8 and n10 to step up the signal n10 in response to the signal n5. The NMOS transistor N4 generates the signal n10 at the external power voltage level VEXT in response to the signal n6. The inverters I4 and I5 delay the signal n2 to generate a signal n9. The NMOS capacitor NC4 steps up the signal n10 in response to the signal n9. The inverter I7 inverts an output signal of the second level shifter 16 to generate a signal n11. The inverter I8 inverts the signal n11 to generate a signal n12. The NMOS transistor N6 generates the signal n13 at the external power voltage level VEXT in response to the signal n11. The NMOS capacitor NC5 steps up the signal n13 in response to the signal n12. The NMOS transistor N7 facilitates charge sharing between the node n10 and the high voltage generation terminal in response to the signal n13.

Figure 2:
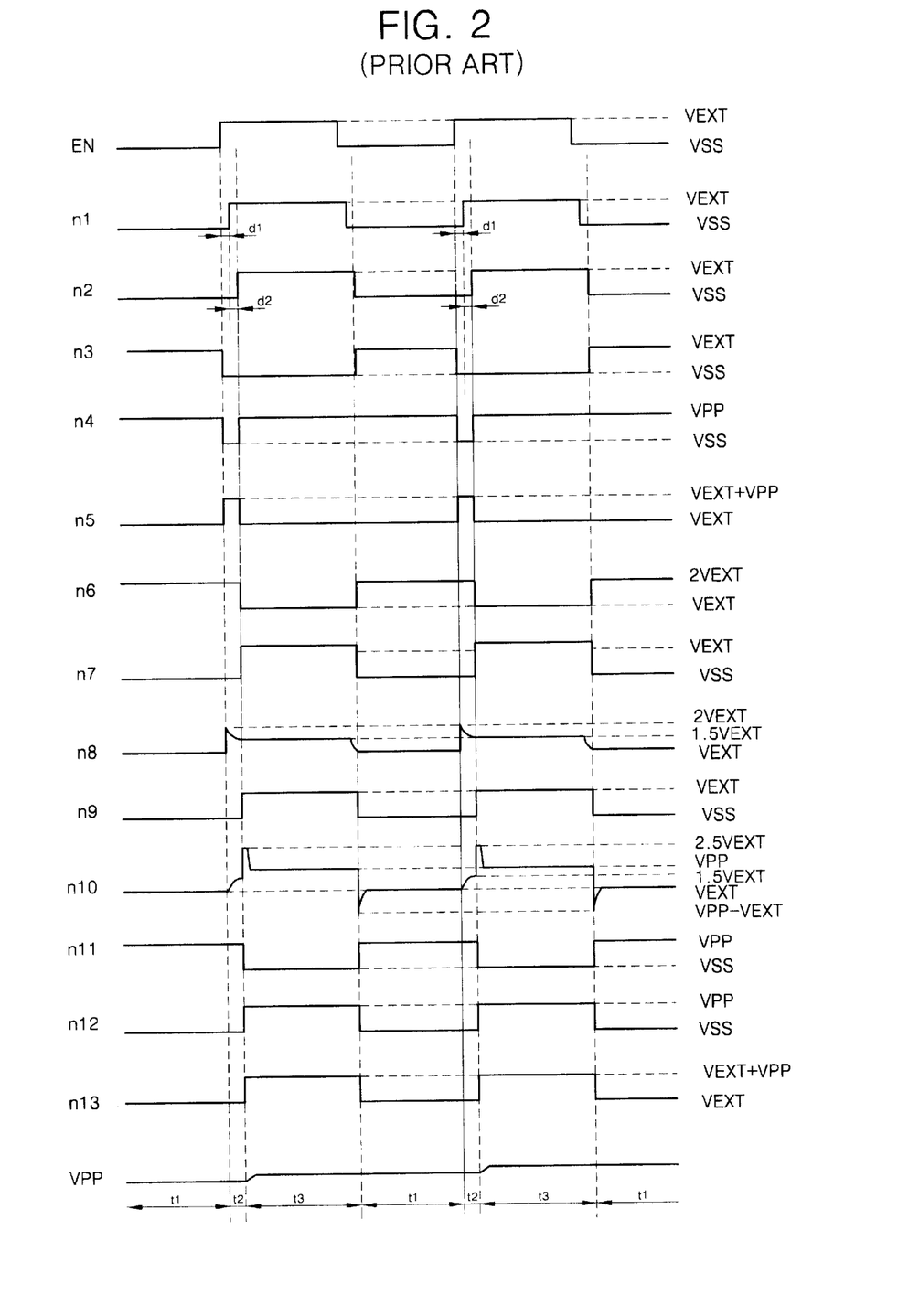
FIG. 2 is a timing diagram that illustrates waveforms of signals of the conventional voltage generation circuit of FIG. 1.

FIG. 2 is a waveform diagram that illustrates operations of the conventional high voltage generating circuit 100 of FIG. 1. During a time period t1, the external power voltage VEXT is applied and the pulse signal EN is at a common or ground voltage level VSS. The first delay circuit 10 delays the pulse signal EN by a first delay time d1 to generate a signal n1 at the ground voltage level VSS. The second delay circuit 12 delays the signal n1 by a second delay time d2 to generate a signal n2 at the ground voltage level VSS. The NOR gate NOR1 NORs the pulse signal EN and the signal n2 to generate a signal n3 at the external power voltage level VEXT. The NOR gate NOR2, the first level shifter 14, and the inverter I1 receive the signals n2 and n3 to generate the signal n4 at the high voltage level VPP. The NMOS transistor N1 pre-charges the signal n5 to the external power voltage level VEXT in response to the signal n4. The inverter I3 inverts the signal n3, which is at the external power voltage level VEXT, to generate the signal n7 at the ground voltage level VSS. The NMOS transistor N2 pre-charges the signal n6 to the external power voltage level VEXT. The NMOS capacitor NC2 steps up the signal n6 to a voltage of 2VEXT when the signal n3 is driven to the external power voltage level VEXT. The NMOS transistors N3 and N4 pre-charge the signals n8 and n10 to the external power voltage level VEXT, respectively, when their gate terminals are driven to a voltage level of 2VEXT. The inverters I4 and I5 generate the signal n9 at the ground voltage level VSS in response to the signal n2. The NAND gate NA1, the inverter I6, the second level shifter 16, and the inverter I7 generate the signal n11 at the high voltage level VPP in response to the signals n1 and n2. The inverter I8 generates the signal n12 at the ground voltage level VSS in response to the signal n11. The NMOS transistor N6 pre-charges the signal n13 to the external power voltage level VEXT in response to the signal n11.

During a time period t2 that the pulse signal EN transitions from the ground voltage level VSS to the external power voltage level VEXT, the first delay circuit 10 delays the pulse signal EN by the first delay time d1 to generate the signal n1 at the external power voltage level VEXT. The second delay circuit 12 delays the signal n1 by the second delay time d2 to generate the signal n2 at the external power voltage VEXT level. The NOR gate NOR1 NORs the signals n1 and n2 to generate the signal n3 at the ground voltage level VSS. The NOR gate NOR2, the first level shifter 14, and the inverter I1 generate the signal n4 at the ground voltage level VSS in response to the signal n3. The inverter I2 inverts the signal n4 to generate a signal at the high voltage level VPP. The NMOS capacitor NC1 steps up the signal n5 to a voltage of "VEXT+VPP" in response to the signal at the output of the inverter I2. The NMOS capacitor NC3 steps up the signal n8 to a voltage of 2VEXT in response to the signal n7 being driven to the external power voltage level VEXT. The inverters I4 and I5 generate the signal n9 at the ground voltage level VSS in response to the signal n2. The NAND gate NA1, the inverter I6, the second level shifter 16, and the inverter I7 generate the signal n11 at the high voltage level VPP in response to the signals n1 and n2. The NMOS transistor N6 is turned on and drives the signal n13 to the external power voltage level VEXT in response to the signal n11. The inverter I8 inverts the signal n11 to generate the signal n12 at the ground voltage level VSS.

Because the NMOS transistors N4 and N7 are turned off and the NMOS transistor N5 is turned on during the time period t2, charge is shared between the nodes n8 and n10. As a result, the signal n8 is driven to a voltage 1.5VEXT and the signal n10 is driven a level of 1.5VEXT. Thus, a first step-up operation is performed on the signal n10.

During a time period t3, the signal n4 is transitions to the high voltage level VPP, the signal n5 transitions to the external power voltage level VEXT, the signal n9 transitions to the external power voltage level VEXT, and the signal n13 transitions to a voltage level of "VEXT+VPP". The signals n6 and n7 are at the external power voltage level VEXT. As a result, the NMOS capacitor NC4 steps up the signal n10 to a voltage level of 2.5VEXT in response to the signal n9.

At this moment, the NMOS transistors N4 and N5 are turned off, and the NMOS transistor N7 is turned on, so that charge sharing is performed between the node n10 and the high voltage generating terminal, which results in the signal n10 transitioning from the voltage 2.5VEXT to the high voltage level VPP. The signal n8 maintains a voltage level of 1.5VEXT.

After the time period t3, operations of the time periods t1 through t3 described above may be repeatedly performed to generate the high voltage VPP. In summary, the conventional high voltage generating circuit 100 steps up the node n8 from a voltage VEXT to a voltage 2VEXT and the node n5 from a voltage VEXT to a voltage "VEXT+VPP" during the second time interval t2 to turn on the NMOS transistor N5, to allow charge sharing between the nodes n10 and n8. This charge sharing operation steps up the voltage level at the node n10 to 1.5VEXT.

Thereafter, the node n9 transitions from the ground voltage level VSS to the external power voltage level VEXT to step up the voltage at the node n10 to 2.5VEXT using the NMOS capacitor NC4. Also, the node n13 is driven from the external power voltage level VEXT to a voltage of "VEXT+VPP," which turns the NMOS transistor N7 on to allow charge sharing between the node n10 and the high voltage generating terminal VPP. The amount of charge transferred may be given by "NC4×(2.5VEXT−VPP)." After a second step-up operation is performed at the node n10, a voltage of the node n13 falls to the external power voltage level VEXT, which turns the NMOS transistor N7 off. The NMOS transistors N3 and N4 again precharge the signals n8 and n10 to the external power voltage level VEXT, respectively, when their gate terminals are driven to a voltage level of 2VEXT.

Typically, the sizes of the step-up capacitors NC3 and NC4 are set based on an assumption that the external power voltage VEXT is in a predetermined range. When the external power voltage VEXT is below the expected voltage range, then the conventional high voltage generating circuit can generate a high voltage target by increasing the capacitances of the step-up capacitors NC3 and NC4. Unfortunately, increasing the size of one or both of the step-up capacitor may increase the layout area needed to accommodate the high voltage generating circuit 100.

SUMMARY OF THE INVENTION

According to some embodiments of the present invention, a voltage generation circuit generates an output voltage at an output node thereof by sharing charge between a first node and a second node so as to increase a potential at the second node from a first voltage to a second voltage. The first node is charged to a third voltage and the second node is driven to a fourth voltage that is greater than the third voltage. Charge is shared between the first node and the second node so that the first and second nodes reach a common fifth voltage, which is between the third and fourth voltages. The first node is driven to a sixth voltage, which is greater than the fourth voltage. Charge is shared between the first node and the output node to generate the output voltage thereat. Advantageously, by sharing charge between the first node and the second node to increase the potential of the second node, the second node may be driven to a relatively high voltage, i.e., the fourth voltage described above, without the need to increase a size of a capacitor that may be used to drive the second node.

In other embodiments of the present invention, a capacitor may be used to drive the second node to the fourth voltage and/or a capacitor may be sued to drive the first node to the sixth voltage.

In still other embodiments of the present invention, charge may be shared between the first node and the second node to increase the potential at the second node from the first voltage to the second voltage by generating a first control signal and closing a switch between the first node and the second node responsive to the first control signal.

In still further embodiments of the present invention, charge may be shared between the first node and the second node so that the first and second nodes reach the common fifth voltage by generating a second control signal and closing the switch between the first node and the second node responsive to the second control signal.

Although embodiments of the present invention have been described above primarily with respect to method embodiments, voltage generation circuit embodiments are also provided.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present. Signals and the media carrying those signals may be referred to by the same names.

Figure 3:
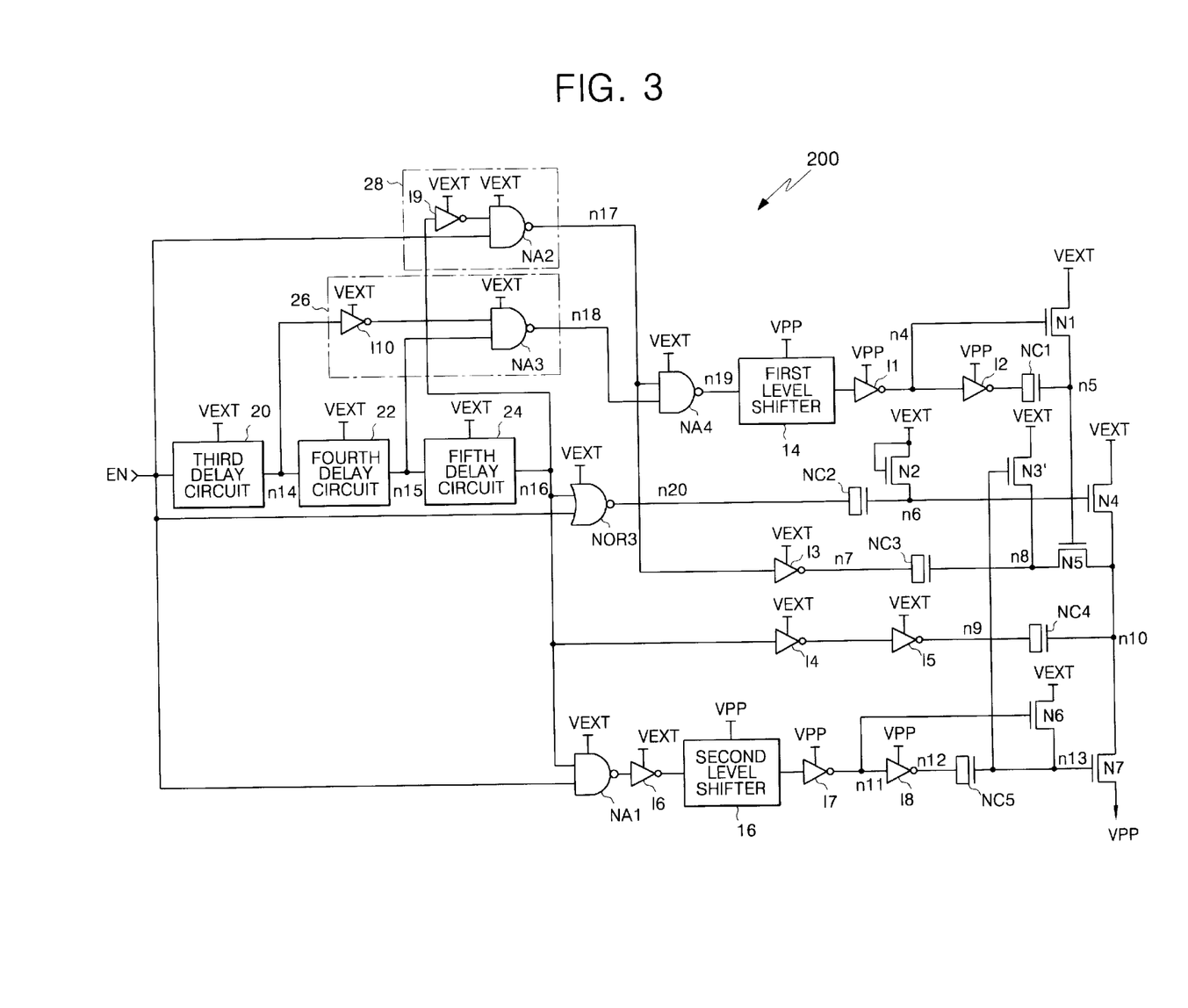
FIG. 3 is a block diagram that illustrates a voltage generation circuit in accordance with some embodiments of the present invention.

FIG. 3 is a circuit diagram that illustrates a high voltage generating circuit 200 in accordance with some embodiments of the present invention. The high voltage generating circuit 200 comprises third, fourth, and fifth delay circuits 20, 22, and 24, a first pulse generating circuit 26, which comprises an inverter I10 and a NAND gate NA3, a second pulse generating circuit 28, which comprises an inverter I9 and a NAND gate NA2, NAND gates NA1 through NA4, a NOR gate NOR3, first and second level shifters 14 and 16, inverters I1 through I8, NMOS transistors N1, N2, N3', and N4 through N7, and NMOS capacitors NC1 through NC5.

An external power voltage VEXT is applied to the third, fourth and fifth delay circuits 20, 22 and 24, NAND gates NA1 through NA4, NOR gate NOR3, and inverters I3 through I6, I9 and I10. A high voltage VPP is applied to the inverters I1, I2, I7, and I8, and the first and second level shifters 14 and 16.

The third, fourth, and the fifth delay circuits 20, 22 and 24, the first pulse generating circuit 26, the second pulse generating circuit 28, the NAND gates NA1 and NA4, the NOR gate NOR3, the first and the second level shifters 14 and 16, and the inverters I1 through I8 comprise a control signal generating circuit to control voltage step-up operations of the high voltage generating circuit 200. The NMOS capacitor NC1 and the NMOS transistor N1 comprise a circuit to step up and pre-charge the signal n5. The NMOS capacitor NC2 and the NMOS transistor N2 comprise a circuit to step up and pre-charge the signal n6. The NMOS capacitor NC3 comprises a circuit to step up the signal n8. The NMOS capacitor NC4 comprises a circuit to step up the signal n10.

The NMOS capacitor NC5 and the NMOS transistor N6 configure a circuit to step up and pre-charge the signal n13. The NMOS transistors N3' and N4 comprise a circuit to pre-charge the signals n8 and n10, respectively. The NMOS transistor N5 is configured to transmit charge between the nodes n8 and n10. The NMOS transistor N7 is configured to transmit charge between node n10 and a high voltage generating terminal.

Exemplary operations of the high voltage generating circuit 200, in accordance with some embodiments of the present invention, are described hereafter. The third delay circuit 20 delays the enable pulse signal EN by a third delay time d3 to generate a signal n14. The fourth delay circuit 22 delays an output signal of the third delay circuit 20 by a fourth delay time d4 to generate a signal n15. The fifth delay circuit 24 delays an output signal of the fourth delay circuit 22 by a fifth delay time d5 to generate a signal n16. The first pulse signal generating circuit 26 generates a signal n18 by NANDing the signal n16 and an inverted version of the signal n14. The second pulse signal generating circuit 28 generates the signal n17 by NANDing the signal EN and an inverted version of the signal n16. The NAND gate NA4 generates a signal n19 by NANDing the signals n17 and n18. The NOR gate NOR3 generates a signal n20 by NORing the signals EN and n16. The NAND gate NA1 and the inverter I6 AND the signals EN and n16. The first level shifter 14 shifts a level of the signal n19. The second level shifter 16 shifts a level of an output signal of the inverter I6. The inverter I1 inverts an output signal of the first level shifter 14 to generate a signal n4. The inverter I2 inverts the signal n4. The NMOS transistor N1 pre-charges the signal n5 to the external power voltage level VEXT in response to the signal n4. The NMOS capacitor NC1 steps up the signal n5 to a voltage "VEXT+VPP" in response to an output signal of the inverter I2. The NMOS transistor N2 pre-charges the signal n6 to the external power voltage level VEXT. The NMOS capacitor NC2 steps up the node n6 to a voltage 2VEXT in response to the signal n20. The NMOS transistor N4 pre-charges the node n10, which corresponds to a step up node, in response to the signal n6. The inverter I3 inverts the signal n17. The NMOS transistor N3' pre-charges the signal n8 to the external power voltage level VEXT in response to the signal n13. The NMOS capacitor NC3 steps up the node n8 to the voltage 2VEXT in response to the signal n7. The NMOS transistor N5 facilitates charge sharing between nodes n8 and n10 to step up the signal n10 in response to the signal n5. The inverters I4 and I5 generate the signal n9 by delaying and buffering the signal n16. The NMOS capacitor NC4 steps up the signal n10 in response to the signal n9. The inverter I7 inverts an output signal of the second level shifter 16 to generate the signal n11. The inverter I8 inverts the signal n11 to generate the signal n12. The NMOS transistor N6 pre-charges the signal n13 to the external power voltage level VEXT in response to the signal n11. The NMOS capacitor NC5 steps up the signal n13 to a voltage "VEXT+VPP" in response to the signal n12. The NMOS transistor N7 facilitates charge sharing between the node n10 and the high voltage generation terminal in response to the signal n13.

Figure 4:
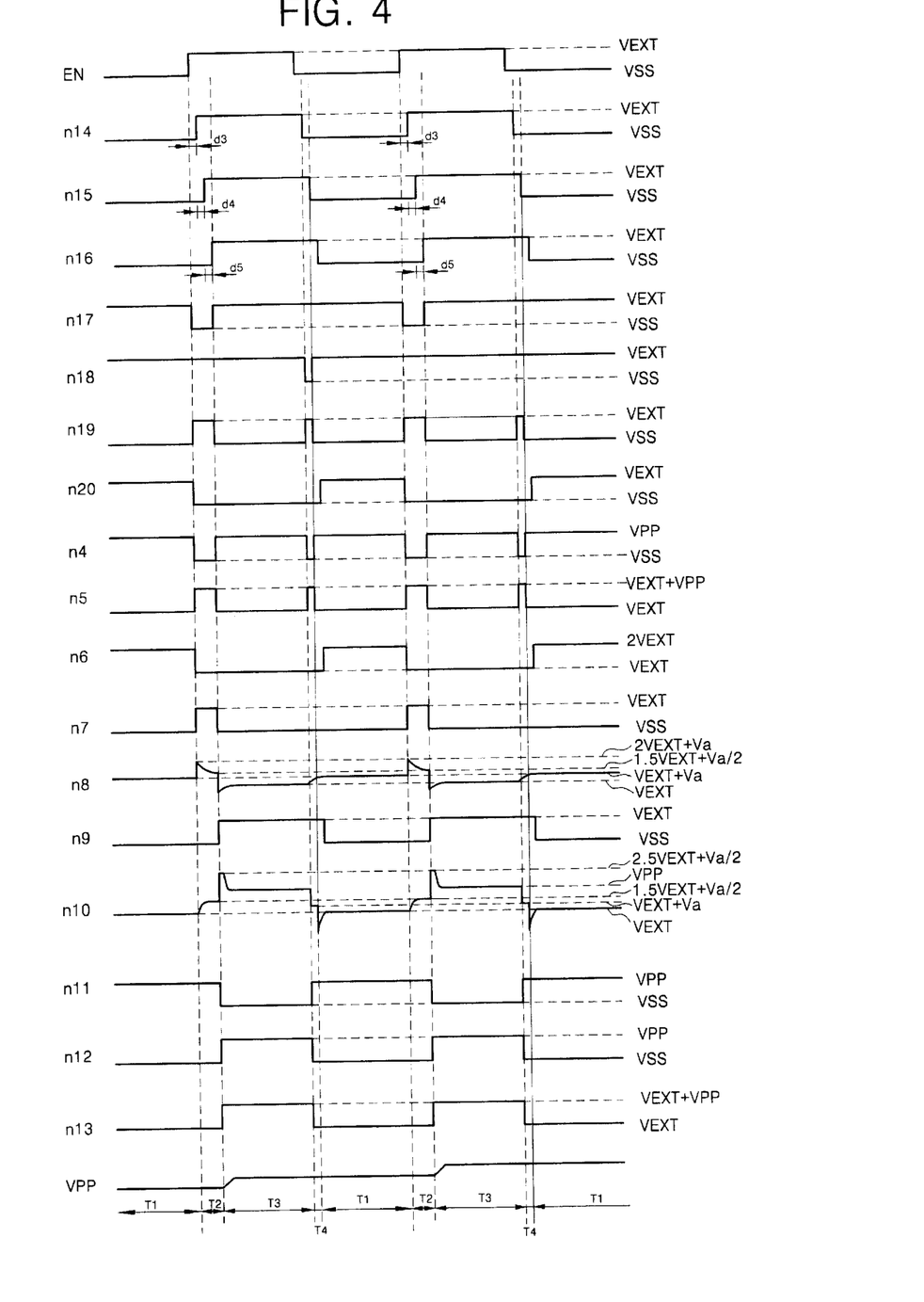
FIG. 4 is a timing diagram that illustrates waveforms of signals of the voltage generation circuit of FIG. 3 in accordance with some embodiments of the present invention.

FIG. 4 is a waveform diagram that illustrates exemplary operations of the high voltage generating circuit 200 of FIG. 3 in accordance with some embodiments of the present invention. Wave forms of FIG. 4 represent signals n1 through n20 of the high voltage generating circuit of FIG. 1, which are generated after step-up operation have been performed multiple times.

During a time period T1, the pulse signal EN is applied at a common or ground voltage level VSS. The signals n14, n15, n16, n19, n7, and n9 are driven to the ground voltage VSS, and the signals n17, n18, n20, and n10 are driven to the external power voltage VEXT. The signals n4 and n11 are at the high voltage VPP, and the signal n6 is at the voltage 2VEXT. The signals n5 and n13 are pre-charged to the external power voltage level VEXT, and the signal n8 is pre-charged to a voltage "VEXT+Va" where Va=(VPP−VEXT)/2.

During a time period T2 that the pulse signal EN transitions from the ground voltage level VSS to external power voltage level VEXT, the signals n14, n15 and n16 are delayed by delay times d1, d2 and d3 and then transition from the ground voltage level VSS to the external power voltage level VEXT, respectively. The signals n17, n20, n4, n6, n9, and n12 transition to the ground voltage level VSS, the signals n18, n19, n6, and n7 transition to the external power voltage level VEXT, and the signal n11 remains at the high voltage level VPP. The signal n5 transitions to a voltage of "VEXT+VPP," and the signal 13 remains at the external power voltage level VEXT. As a result, node n8 is stepped up to a voltage of "2VEXT+Va" in response to the signal n7. At this moment, the NMOS transistors N4 and N7 are turned off and the NMOS transistor N5 is turned on to allow charge sharing between the nodes n8 and n10. Due to the charge sharing, the signal n8 is stepped down from a voltage of "2VEXT+Va" to a voltage of "1.5VEXT+(Va/2)," and the signal n10 is stepped up from a voltage of VEXT to a voltage of "1.5VEXT+(Va/2)."

During a time period T3, the signals n14, n15, n16, n18, and n6 remain at the external power voltage level VEXT, and the signal n20 remains at the ground voltage level VSS. The signal n11 transitions from the high voltage level VPP to the ground voltage level VSS. The signal n17 transitions from the ground voltage level VSS to the external power voltage level VEXT, the signal n19 is transited from the external power voltage level VEXT to the ground voltage level VSS, and the signals n4 and n12 transition from the ground voltage level VSS to the high voltage level VPP. The signal n5 transitions from the voltage level "VEXT+VPP" to the external power voltage level VEXT, the signal n9 transitions from ground voltage level VSS to the external power voltage level VEXT, and the signal n13 transitions from the external power voltage level VEXT to a voltage of "VEXT+VPP." Hence, the signal n8 transitions to the external power voltage level VEXT, and the NMOS capacitor NC4 steps up the signal n10 to a voltage of "2.5VEXT+(Va/2)" in response to the signal n9. At this moment, the NMOS transistors N4 and N5 are turned off and the NMOS transistor N7 is turned on to allow charge sharing between the node n10 and the high voltage generating terminal. The signal n10 drops from a voltage level of "2.5VEXT+(Va/2)" to the high voltage level VPP. A total charge quantity transferred to the high voltage generating terminal through the NMOS transistor N7 may be represented by "NC4×(2.25VEXT−0.75VPP)."

During a time period T4, the signal n14 transitions to the ground voltage level VSS, the signals n15, n16, n17, and n9 remain at the external power voltage level VEXT, and the signals n20 and n7 remain at the ground voltage level VSS. The signal n18 transitions from the external power voltage level VEXT to the ground voltage level VSS, and the signal n19 transitions from the ground voltage level VSS to the external power voltage level VEXT.

The signals n4 and n12 transition from the high voltage level VPP to the ground voltage level VSS, the signal n1 transitions from the ground voltage level VSS to the high voltage level VPP, the signal n13 transitions from the external power voltage level VEXT to a voltage of "VEXT+VPP," and the signal n5 transitions from the external power voltage level VEXT to a voltage of "VEXT+VPP." Hence, the NMOS transistors N4 and N7 are turned off and the NMOS transistor N5 is turned on to allow charge sharing between the nodes n8 and n10. The signal n8 increases from the external power voltage level VEXT to a voltage of "VEXT+Va" and the signal n10 decreases from the high voltage level VPP to a voltage of "VEXT+Va."

The high voltage generating circuit 200 of FIG. 3 generates a high voltage VPP by repeatedly performing operations of the time periods T1 through T4, which are described above. A total charge quantity transferred to the high voltage generating terminal through the NMOS transistor N7 by the high voltage generating circuit 200 of FIG. 3 is "NC4×(2.25VEXT−0.75VPP)," and a total charge quantity transferred to the high voltage generating terminal through the NMOS transistor N7 by the conventional high voltage 100 generating circuit is "NC4×(2.5VEXT−VPP)." Thus, the high voltage generating circuit 200, in accordance with some embodiments of the present invention, can transmit a charge quantity more than the conventional high voltage generating circuit 100 of FIG. 1. If the external power voltage VEXT is 2 volts and a target high voltage VPP is 4 volts, then the conventional high voltage generating circuit 100 of FIG. 1 can transmit a total charge quantity of 1.0×NC4 to the high voltage generating terminal, whereas the high voltage generating circuit 200 of FIG. 3 can transmit a total charge quantity of 1.5×NC4.

That is, the high voltage generating circuit 200 increases a voltage level of the signal n8 such that the NMOS transistor N5 is turned on and the NMOS transistors N4 and N7 are turned off to allow charge sharing between the nodes n8 and n10 during the time period T4, thereby improving a step-up ability. As a result, when the signal n10 is first stepped up during the time period T1, a step-up voltage level can be increased. Advantageously, the high voltage generating circuit 200 may increase a step-up ability, not by increasing a step-up ability of the step-up transistors NC3 and NC4, but by generate additional control signals through an additional delay circuit and additional logic circuitry.

Figure 5:
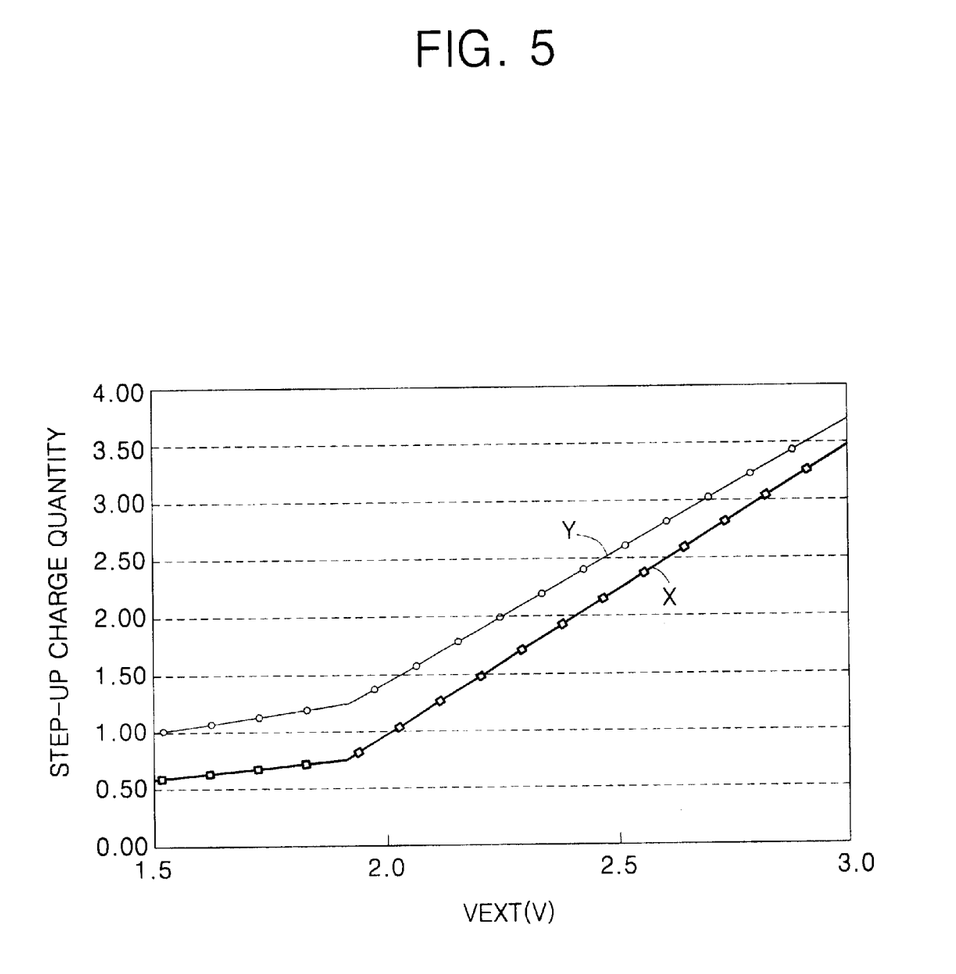
FIG. 5 is a graph of step-up charge quantity versus external power voltage for the voltage generation circuit of FIG. 3 and the conventional voltage generation circuit of FIG. 1.

FIG. 5 is a graph of step-up charge quantity versus external power voltage VEXT for the high voltage generating circuit 200 of FIG. 3 and the conventional high voltage generating circuit 100 of FIG. 1. The values denoted by "X" correspond to the high voltage generating circuit 200 of FIG. 3 and the values denoted by "Y" correspond to the conventional high voltage generating circuit 100 of FIG. 1. As can be seen in FIG. 5, when the external power voltage VEXT is less than 1.9 volts, the step-up charge quantity generated by the high voltage generating circuit 200 is approximately twice that of the conventional high voltage generating circuit 100. When the external power voltage VEXT exceeds 1.9 volts, the step-up charge quantity generated by the high voltage generating circuit 200 exceeds that of the conventional high voltage generating circuit 100.

Advantageously, high voltage generating circuits, in accordance with some embodiments of the present invention, may improve step-up ability without increasing a size of the step-up capacitor, which may obviate a need to increase layout area size.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

I claim:

1. A method of operating a voltage generation circuit to generate an output voltage at an output node thereof, comprising:
    sharing charge between a first node and a second node so as to increase a potential at the second node from a first voltage to a second voltage;
    charging the first node to a third voltage;
    driving the second node to a fourth voltage that is greater than the third voltage;
    sharing charge between the first node and the second node so that the first and second nodes reach a common fifth voltage between the third and fourth voltages;
    driving the first node to a sixth voltage that is greater than the fourth voltage; and
    sharing charge between the first node and the output node to generate the output voltage thereat.

2. The method of claim 1, wherein a difference between the second voltage and the first voltage is about one-half of a difference between a voltage of the first node and the first voltage.

3. The method of claim 1, wherein driving the second node to the fourth voltage comprises:
    charging a capacitor that has a first terminal coupled to the second node to about the second voltage; and
    increasing a voltage of a second terminal of the capacitor by about a difference between the fourth voltage and the second voltage.

4. The method of claim 1, wherein driving the first node to the sixth voltage comprises:
    charging a capacitor that has a first terminal coupled to the first node to about the fifth voltage; and
    increasing a voltage of a second terminal of the capacitor by about a difference between the sixth voltage and the fifth voltage.

5. The method of claim 1, wherein sharing charge between the first node and the second node so as to increase the potential at the second node from the first voltage to the second voltage comprises:
    generating a first control signal; and
    closing a switch between the first node and the second node responsive to the first control signal.

6. The method of claim 5, wherein sharing charge between the first node and the second node so that the first and second nodes reach the common fifth voltage between the third and fourth voltages comprises:
    generating a second control signal; and
    closing the switch between the first node and the second node responsive to the second control signal.

7. The method of claim 6, wherein driving the second node to the fourth voltage that is greater than the third voltage comprises:
    driving the second node to the fourth voltage that is greater than the third voltage responsive to the second control signal.

8. A voltage generation circuit, comprising:
    a control signal generator circuit that is configured to generate first, second, and third control signals, the first control signal defining a first time interval and the second control signal defining a second time interval that does not overlap with the first time interval;
    first and second nodes that are coupled to each other by a first switch that is responsive to the first and second control signals;
    a first capacitor that is coupled between the second node and the control signal generator circuit and is responsive to the first control signal;
    a second capacitor that is coupled between the first node and the control signal generator circuit and is responsive to the third control signal; and
    a second switch that couples the first node to an output node and is responsive to the third control signal.

9. The voltage generation circuit of claim 8, wherein the first switch is operative to close during the first time interval responsive to the first control signal, to close during the second time interval responsive to the second control signal, and to open at times other than the first and second time intervals responsive to the first and second control signals.

10. The voltage generation circuit of claim 8, wherein the first and second switches are MOS transistors.

11. The voltage generation circuit of claim 8, wherein the first and second capacitors are MOS capacitors.

12. The voltage generation circuit of claim 8, wherein the control signal generator circuit is responsive to an enable signal.

13. A voltage generation circuit, comprising:
    means for sharing charge between a first node and a second node so as to increase a potential at the second node from a first voltage to a second voltage;
    means for charging the first node to a third voltage;
    means for driving the second node to a fourth voltage that is greater than the third voltage;
    means for sharing charge between the first node and the second node so that the first and second nodes reach a common fifth voltage between the third and fourth voltages;
    means for driving the first node to a sixth voltage that is greater than the fourth voltage; and
    means for sharing charge between the first node and an output node to generate an output voltage thereat.

14. The circuit of claim 13, wherein a difference between the second voltage and the first voltage is about one-half of a difference between a voltage of the first node and the first voltage.

15. The circuit of claim 13, wherein the means for driving the second node to the fourth voltage comprises:
    means for charging a capacitor that has a first terminal coupled to the second node to about the second voltage; and means for increasing a voltage of a second terminal of the capacitor by about a difference between the fourth voltage and the second voltage.

16. The circuit of claim 13, wherein the means for driving the first node to the sixth voltage comprises:
   means for charging a capacitor that has a first terminal coupled to the first node to about the fifth voltage; and
   means for increasing a voltage of a second terminal of the capacitor by about a difference between the sixth voltage and the fifth voltage.

17. The circuit of claim 13, wherein the means for sharing charge between the first node and the second node so as to increase the potential at the second node from the first voltage to the second voltage comprises:
   means for generating a first control signal; and
   means for closing a switch between the first node and the second node responsive to the first control signal.

18. The circuit of claim 17, wherein the means for sharing charge between the first node and the second node so that the first and second nodes reach the common fifth voltage between the third and fourth voltages comprises:
   means for generating a second control signal; and
   means for closing the switch between the first node and the second node responsive to the second control signal.

19. The circuit of claim 18, wherein the means for driving the second node to the fourth voltage that is greater than the third voltage comprises:
   means for driving the second node to the fourth voltage that is greater than the third voltage responsive to the second control signal.

20. A high voltage generating circuit, comprising:
   a control signal generating circuit for receiving an enable pulse signal to generate first to fifth control signals;
   a first pre-charge and step-up means for pre-charging a first node in response to the first control signal during a first pre-charge operation and for stepping up the first node in response to an inverted signal of the first control signal during a first step-up operation and a second pre-charge operation;
   a first pre-charge means for stepping up and pre-charging a second node in response to the second control signal during the first pre-charge operation;
   a first step-up means for stepping up a pre-charge node in response to the third control signal during the first step-up operation;
   a second step-up means for stepping up a step-up node in response to the fourth control signal during a second step-up operation and the second pre-charge operation;
   a second pre-charge and step-up means for pre-charging a high voltage generating control node in response to the fifth control signal during the first pre-charge operation, the first step-up operation, and the second pre-charge operation and for stepping up the high voltage generating control node in response to an inverted signal of the fifth control signal during the second step-up operation;
   a second pre-charge means for pre-charging the pre-charge node in response to a signal of the high voltage generating control node during the second step-up operation;
   a third pre-charge means for pre-charging the step-up node in response to a signal of the second node during the first pre-charge operation;
   a first charge transmitting means for transmitting a charge to a node between the pre-charge node and the step-up node in response to a signal of the first node during the first step-up operation and the second pre-charge operation; and
   a second charge transmitting means for transmitting a charge to a node between the step-up node and a high voltage generating terminal in response to a signal of the high voltage generating control node during the second step-up operation.

21. The circuit of claim 20, wherein the control signal generating means comprises:
   a first delay circuit for delaying the enable pulse signal;
   a second delay circuit for delaying an output signal of the first delay circuit;
   a third delay circuit for delaying an output signal of the second delay circuit to generate a delayed pulse signal;
   a first pulse signal generating circuit for receiving the enable pulse signal and an output signal of the third delay circuit to generate the first pulse signal;
   a second pulse signal generating circuit for receiving output signals of the first and the second delay circuits to generate the second pulse signal;
   a first control signal generating circuit for generating the first control signal by ANDing and level-shifting the first and the second pulse signals;
   a second control signal generating circuit for generating the second control signal by NORing the enable pulse signal and the delayed pulse signal;
   a third control signal generating circuit for generating the third control signal by inverting the first pulse signal;
   a fourth control signal generating circuit for generating the fourth control signal by delaying the delayed pulse signal; and
   a fifth control signal generating circuit for NANDing and level-shifting the enable pulse signal and the delayed pulse signal.

22. The circuit of claim 21, wherein the first pre-charge and step-up means comprises:
   a first pre-charge transistor for pre-charging the first node in response to the first control signal; and
   a first capacitor for stepping up the first node in response to an inverted signal of the first control signal.

23. The circuit of claim 22, wherein the first pre-charge means comprises:
   a second capacitor for stepping up the second node in response to the second control signal; and
   a second pre-charge transistor for pre-charging the second node.

24. The circuit of claim 23, wherein the first step-up means comprises a third capacitor for stepping up the pre-charge node in response to the third control signal.

25. The circuit of claim 24, wherein the second step-up means comprises a fourth capacitor for stepping up the step-up node in response to the fourth control signal.

26. The circuit of claim 25, wherein the second pre-charge and step-up means comprises:
   a third pre-charge transistor for pre-charging a high voltage transmission control signal in response to the fifth control signal; and
   a fifth capacitor for stepping up the high voltage transmission control signal in response to an inverted signal of the fifth control signal.

27. A high voltage generating circuit, comprising:
   a pulse signal generating means for generating a first pulse signal in response to a rising transition of an enable pulse signal during a first time period, for generating a second pulse signal in response to a falling transition of the enable pulse signal during a second time period, and for generating a delayed pulse signal by delaying the enable pulse signal by the first time period;

a first pre-charge and step-up means for receiving the first and the second pulse signals to pre-charge a first node during third and fourth time periods and to step up the first node during the first and the second time periods;

a first pre-charge means for receiving the enable pulse signal and the delayed pulse signal to step-up and pre-charge the second node during the third time period;

a first step-up means for pre-charging a pre-charge node in response to a high voltage transmission control signal during the fourth time period and for stepping up the pre-charge node in response to the second pulse signal during the first and the second time periods;

a second step-up means for stepping up a step-up node in response to the delayed pulse signal during the second and the fourth time periods;

a second pre-charge means for pre-charging the step-up node in response to a signal of the second node during the third time period;

a second pre-charge and step-up means for receiving the enable pulse signal and the delayed pulse signal to pre-charge the high voltage transmission control signal during the first to the third time periods and to step up the high voltage transmission control signal during the fourth time period;

a first charge transmission means for being turned on in response to a signal of the first node to transmit a charge to a node between the pre-charge node and the step-up node during the first and the second time periods; and a second charge transmission means for being turned on in response to the high voltage transmission control signal to transmit a charge to a node between the high voltage generating node and the step-up node during the fourth time period.

28. The circuit of claim 27, wherein the pulse signal generating means comprises:

a first delay circuit for delaying the enable pulse signal;

a second delay circuit for delaying an output signal of the first delay circuit;

a third delay circuit for delaying an output signal of the second delay circuit to generate a delayed pulse signal;

a first pulse signal generating circuit for receiving the enable pulse signal and an output signal of the third delay circuit to generate the first pulse signal; and a second pulse signal generating circuit for receiving output signals of the first and the second delay circuits to generate the second pulse signal.

29. The circuit of claim 28, wherein the first pre-charge and step-up means comprises:

a first signal generating circuit for generating a first signal by ANDing and level-shifting the first and the second pulse signals;

a first pre-charge transistor for pre-charging the first node in response to the first signal; and a first capacitor for stepping up the first node in response to an inverted signal of the first signal.

30. The circuit of claim 29, wherein the first pre-charge means comprises:

a NOR circuit for NORing the enable pulse signal and an output signal of the third delay circuit;

a second capacitor for stepping up the second node in response to an output signal of the NOR circuit; and a second pre-charge transistor for pre-charging the second node.

31. The circuit of claim 30, wherein the first step-up means comprises:

a third capacitor for stepping up the pre-charge node in response to an inverted signal of the first pulse signal; and a third pre-charge transistor for pre-charging the pre-charge node in response to the high voltage transmission control signal.

32. The circuit of claim 31, wherein the second step-up means comprises a fourth capacitor for stepping up the step-up node in response to an output signal of the third delay circuit.

33. The circuit of claim 32, wherein the second pre-charge and step-up means comprises:

a second signal generating circuit for generating a second signal by NANDing and level-shifting the enable pulse signal and an output signal of the third delay circuit;

a fourth pre-charge transistor for pre-charging the high voltage transmission control signal in response to the second signal; and a fifth capacitor for stepping up the high voltage transmission control signal in response to an inverted signal of the second signal.

34. A method for generating a high voltage, comprising:

a) receiving an enable pulse signal to generate first to fifth control signals;

b) pre-charging first and second nodes, a pre-charge node and a high voltage control node in response to the first and the second control signals, an inverted signal of the fifth control signal, and the fifth control signal, and pre-charging a step-up node in response to a signal of the second node;

c) stepping up the first node and the pre-charge node in response to an inverted signal of the first control signal and the third control signal, and stepping up firstly the step-up node by performing a charge sharing operation between the pre-charge node and the step-up node;

d) stepping up secondly the step-up node in response to the fourth control signal, and generating a high voltage by performing a charge sharing operation between the step-up node and the high voltage generating node in response to an inverted signal of the fifth control signal; and e) stepping up a pre-charge voltage of the pre-charge node by performing a charge sharing operation between the pre-charge node and the step-up node in response to the first control signal, wherein the high voltage is generated by repeatedly performing the steps.

35. The method of claim 34, wherein the step (a) comprises:

generating a first pulse signal in response to a rising transition of the enable pulse signal during the step (b), generating a second pulse signal in response to a falling transition of the enable pulse signal during the step (d), and generating a delayed pulse signal by delaying the enable pulse signal by a time period to perform the step (b); and generating the first control signal by ANDing and level shifting the first and the second pulse signals, generating the second control signal by NORing the enable signal and the delayed pulse signal, generating the third control signal by inverting the first pulse signal, generating the fourth control signal by delaying the delayed pulse signal, and generating the fifth control signal by NANDing and level shifting the enable signal and the delayed pulse signal.

* * * * *